United States Patent Office 2,978,482
Patented Apr. 4, 1961

2,978,482

SULFAMOYLACETONITRILE

Joseph Weinstock, Phoenixville, Pa., assignor to Smith Kline & French Laboratories, Philadelphia, Pa., a corporation of Pennsylvania No Drawing. Filed Feb. 23, 1960, Ser. No. 10,067

1 Claim. (Cl. 260—465.5)

This invention relates to sulfamoylacetonitrile having utility as an intermediate in the preparation of diuretic agents.

More specifically the novel sulfamoylacetonitrile of this invention is a valuable intermediate in the preparation of 6-sulfamoylpteridines having diuretic and natriuretic activity in the animal organism. Sulfamoylacetonitrile is also used to prepare other medicinally active compounds.

The new sulfamoylacetonitrile of this invention is prepared by dehydration of α-sulfamoylacetamide. The dehydration is accomplished by the use of a dehydrating agent such as phosphorus pentoxide, thionyl chloride or, preferably, phosphorus oxychloride. The reaction is carried out preferably with an excess of the dehydrating agent at elevated temperatures such as from about 65 to 100° C. for a period of about 30 to 90 minutes.

The α-sulfamoylacetamide starting material is prepared by reacting chlorosulfonylacetyl chloride with at least two molar equivalents of phenol at an elevated temperature such as from about 100 to 150° C. for a period of about 10 to 12 hours. Cooling and recrystallizing the resulting solid from a suitable solvent such as benzene or benzene-petroleum ether gives diphenyl sulfoacetate. Ammonolysis of this diester in a sealed tube at temperatures of from about 60 to 90° C. for a period of about 10 to 12 hours gives the α-sulfamoyl-acetamide starting material.

The sulfamoylacetonitrile of this invention is a useful intermediate in the preparation of 6-sulfamoylpteridines according to the following procedure, also an object of this invention:

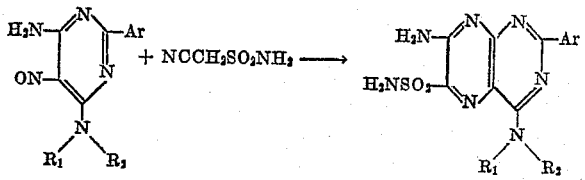

when: Ar represents phenyl, chlorophenyl, tolyl, methoxyphenyl, trifluoromethylphenyl, hydroxyphenyl, aminophenyl, thienyl or pyridyl; and $R_1$ and $R_2$ represent hydrogen or lower alkyl.

4,6-diamino-2-aryl-5-nitrosopyrimidines which are either known to the art or are prepared by condensing an amidine hydrohalide with an alkyl cyanoacetate according to the procedure described in my copending application, Serial No. 810,552, filed May 4, 1959, are reacted with sulfamoylacetonitrile usually in excess in a suitable organic solvent in which the reactants are substantially soluble such as a lower alcohol, for example ethanol or isopropanol, ethoxyethanol or, advantageously, dimethylformamide, usually in the presence of an alkali metal alkoxide such as a potassium or sodium alkoxide, for example sodium methoxide, potassium methoxide or sodium ethoxide, usually in excess. The reaction mixture is heated conveniently at temperatures of from about 50 to 200° C., preferably at reflux temperature for about 5 to 30 minutes. Longer reaction periods are of no particular advantage. Dilution of the mixture with approximately an equal volume of water results in the precipitation of the 6-sulfamoylpteridine.

The following examples are not limiting but are illustrative of the preparation of the compound of this invention and of its use as an intermediate for the preparation of diuretic compounds.

Example 1

A mixture of 88 g. of chlorosulfonylacetyl chloride and 103 g. of distilled phenol is heated at 125° C. for 10 hours. Cooling and recrystallizing the resulting solid from benzene gives diphenyl sulfoacetate.

A solution of 35 g. of diphenyl sulfoacetate in 35 ml. of liquid ammonia is heated in a sealed tube at 75° C. for 16 hours. Evaporating the excess ammonia, filtering the hot solution, cooling and recrystallizing the resulting solid yields α-sulfamoylacetamide.

A mixture of 10 g. of α-sulfamoylacetamide and 25 ml. of phosphorus oxychloride is heated on a steam bath for 45 minutes. The excess phosphorus oxychloride is evaporated in vacuo and the residue is taken up in butanol. Concentrating and chilling the butanol solution gives, as a white solid, sulfamoylacetonitrile, which is recrystallized twice from butanol to give white crystals, M.P. 102–106° C.

Example 2

Sulfamoylacetonitrile (4.0 g.) and 1.78 g. of sodium methoxide are added to a hot solution of 6.45 g. of 4,6-diamino-5-nitroso-2-phenylpyrimidine in 150 ml. of dimethylformamide. The resulting mixture is refluxed for 15 minutes. Water (150 ml.) is added and the resulting product is filtered off, washed with water and recrystallized from aqueous dimethylformamide to give 4,7-diamino-2-phenyl-6-sulfamoylpteridine.

What is claimed is:
Sulfamoylacetonitrile.

References Cited in the file of this patent

Osdene: J. Chem. Soc. (London), pp. 2032–2038 (1955).